United States Patent [19]

Auriol et al.

[11] Patent Number: 5,359,765
[45] Date of Patent: Nov. 1, 1994

[54] RIVET FOR COMPOSITE MATERIAL AND COMPOSITE MATERIAL ASSEMBLY PROCESS

[75] Inventors: Jean-Marc Auriol; Philippe Bornes, both of Flourens, France

[73] Assignee: STE Ateliers de la Haute-Garonne-Ets Auriol et Cie, Balma, France

[21] Appl. No.: 808,448

[22] Filed: Dec. 16, 1991

[51] Int. Cl.$^5$ .................. B21D 39/00; B23P 11/00
[52] U.S. Cl. ...................... 29/525.2; 29/512
[58] Field of Search ............ 29/512, 525.2, 524.1; 411/34–38, 41, 43, 69, 70, 339, 500, 501, 504, 505

[56] References Cited

U.S. PATENT DOCUMENTS

| | | |
|---|---|---|
| 3,078,002 | 2/1963 | Rodgers . |
| 3,089,377 | 5/1963 | Engstrom . |
| 3,837,208 | 9/1974 | Davis . |
| 4,146,118 | 5/1979 | Zankl . |
| 4,221,041 | 9/1980 | Hufnagl . |
| 4,289,060 | 9/1981 | Emmett . |
| 4,289,061 | 9/1981 | Emmett . |
| 4,363,580 | 12/1982 | Bell . |

FOREIGN PATENT DOCUMENTS

| | | |
|---|---|---|
| 445204 | 10/1967 | Switzerland . |
| 1330501 | 9/1973 | United Kingdom . |

*Primary Examiner*—Joseph M. Gorski
*Attorney, Agent, or Firm*—Harold H. Dutton, Jr.

[57] ABSTRACT

A semi-tubular or tubular rivet for joining soft or fragile parts such as composite materials and comprising a pre-formed head (1) and a shank (2) having an axial hole (3) forming a tubular portion (2b) opposite the head (1), a peripheral groove (4) on the outside of the shank (2) at the tubular portion (2b), a pinning surface (Sa) on the outside surface of the shank near the free end of the shank; and a process particularly suited for assembling materials using the rivet.

3 Claims, 5 Drawing Sheets

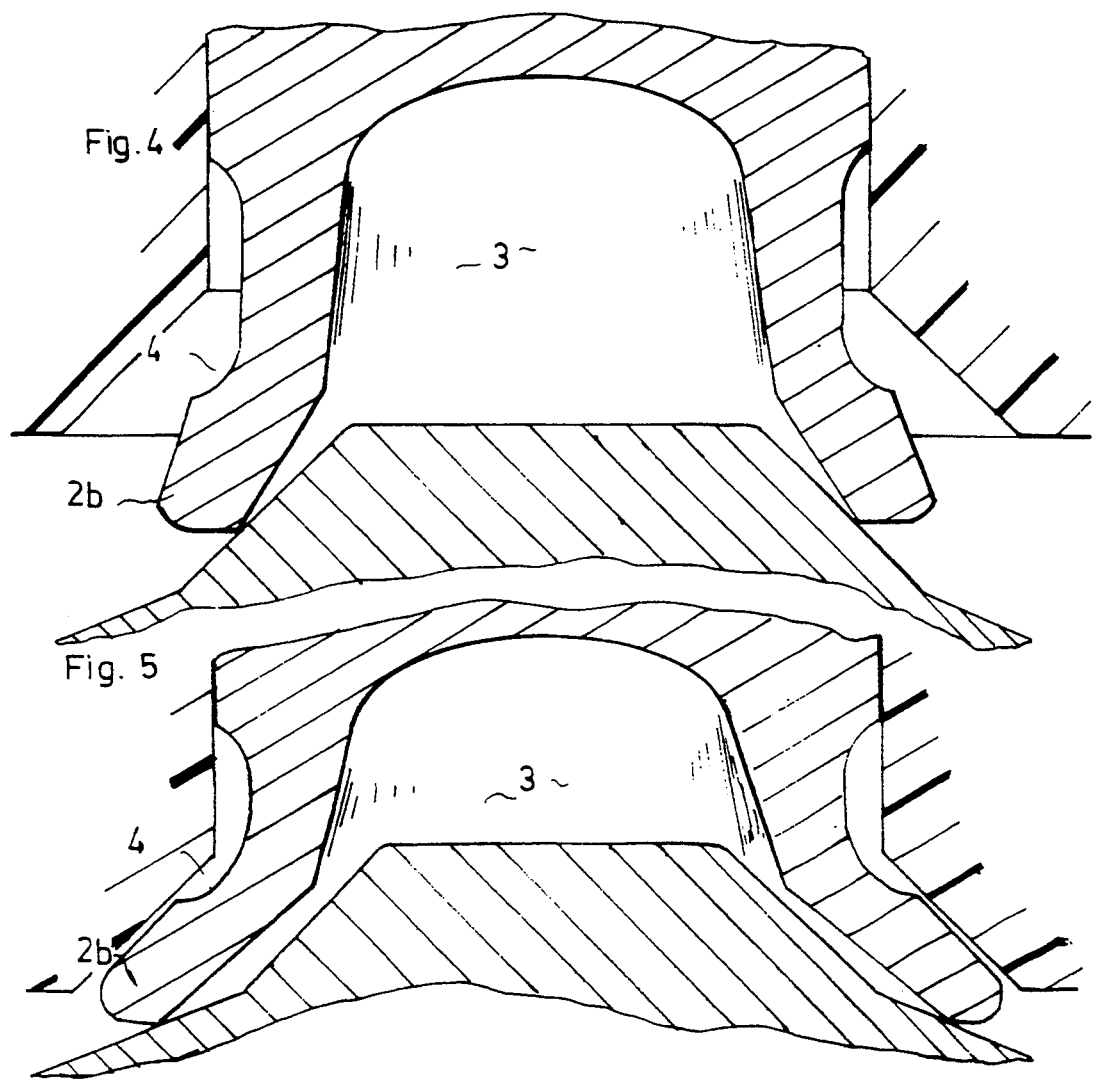
Fig. 4
Fig. 5
Fig. 6
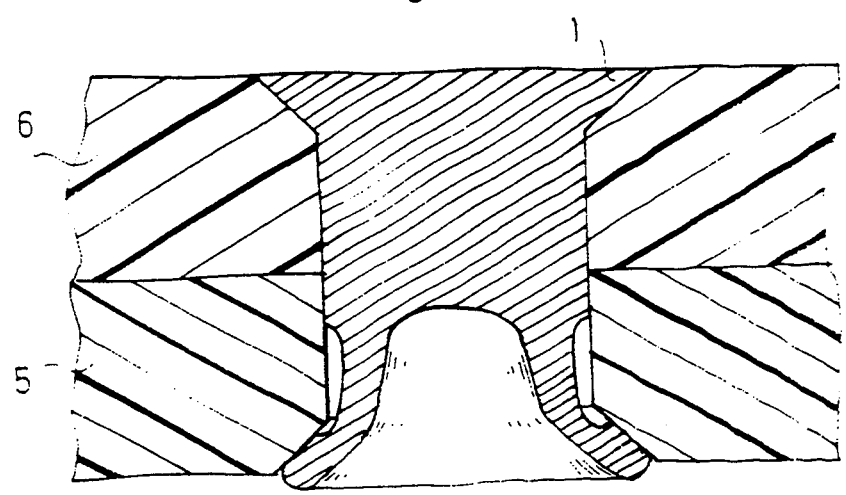

RIVET FOR COMPOSITE MATERIAL AND COMPOSITE MATERIAL ASSEMBLY PROCESS

This invention relates to a rivet having a pre-formed head and a shank having an axial hole therein for forming a tubular part. The rivet may be semi-tubular, whereby the axial hole is blind and extends solely on the side opposite the pre-formed head, or it may also be fully tubular, whereby the axial hole passes through the length of the rivet on both ends, so as to enable blind riveting. The invention particularly relates to assembling parts made from fragile or soft materials, such as laminated plastics which are fiber-reinforced, frequently called "composites."

BACKGROUND AND OBJECTS OF THE INVENTION

Conventional rivets do not provide a satisfactory assembly of composite materials. Frequently, the radial expansion of the rivet shank and the pressures exerted underneath the post-shaped head may cause de-lamination of the material and ungluing of fibers and binder, so that the assembly poorly resists fatigue, and there is a danger that the rivet will come loose prematurely.

U.S. Pat. No. 4,221,041 describes a semi-tubular rivet which is supposed to overcome these drawbacks. However, testing has shown that such a rivet still undergoes a large expansion beneath the post-shaped head, and overall a fairly substantial swelling along the other segments of the shank, whereby the fatigue strength of the assemblies so made as a rule are not satisfactory, particularly in aeronautical applications.

Furthermore, the set-up conditions (applied pressure) affect considerably the quality of the assembly and these rivets must be set at a very precise riveting pressure. However, in practice such an operation is very delicate and difficult to achieve. Finally, a known rivet of a given size is suitable for assembling parts of precise thickness with only narrow tolerance, and under these conditions, the industrial application of these rivets raises substantial practical difficulties.

Accordingly, there is only a poor solution presently available for the problem of riveting soft or fragile materials.

The present invention, therefore, provides an improved rivet allowing the assembly of soft or fragile parts, particularly parts of composite materials, without significant degradation of the material in the area near the rivet, in order that the composite material may retain its original strength.

To that end, the primary object of the present invention is to provide a rivet which can be set without undergoing significant expansion or swelling, whether underneath the post-shaped head or along other parts of the shank.

Another object of the invention is to facilitate the rivet set-up conditions by permitting a wide range of riveting or assembly pressures.

A further object of the invention is to significantly increase the range of thicknesses which can be assembled by the same type of rivet, in order to facilitate the industrial use of these rivets.

Still another object of the invention is to provide an improved assembly process for composite materials.

These and other objects and advantages of this invention will become apparent upon further consideration of the invention, on the basis of the following specification and claims, together with the accompanying drawings.

DESCRIPTION OF THE INVENTION

The rivet according to the invention includes a pre-formed head and a shank having an axial hole extending at least to the side opposite the pre-formed head, to form a tubular portion extending at least opposite the head. In the present invention, a peripheral groove is provided on the outer surface of the shank near its tubular portion on the side opposite the pre-formed head, and a pinning or abutment surface is provided on the outer surface between the groove and the end of the shank.

As will become clear from the discussion below, the peripheral groove forms a bending zone in the tubular portion of the rivet so that due to the applied pressure, the pinning surface will come to rest or abut the material to be joined, without creating a significant dimensional change of the shank parts between the groove and the pre-formed head. Further, along the groove, the shank of the rivet remains out of contact with the material being joined (at least over part of the length of the groove). Thus, in the zone where the second head is formed, namely the area which in the prior art rivets significantly stress the material being joined, the rivet of the present invention exerts no pressure on the material and therefor causes no danger of material degradation in that area.

Preferably the peripheral groove is a distance away from the free end of the rivet shank so that the pinning surface will be retained outside the groove between the groove and the free end of the shank. However, in a variation, the groove may be provided so as to extend to the free end of the shank with its depth decreasing toward that end, the pinning surface then being located within the groove itself.

The rivet of the invention may be of the semi-tubular type, in which the axial hole in the shank opens only to the side opposite the pre-formed head. Setting up such a rivet requires the presence of a matching riveting die supporting the pre-formed head and a riveting die on the other side.

The rivet of the invention may also be of the "blind" type, in which the axial hole extends through the shank from one side to the other. Placing such a rivet in position only requires access on the side of the pre-formed head, and is performed using a stem inserted into the axial hole and provided with a rivet head.

The rivet according to the invention may be made of any suitable material, but preferably comprises titanium or a titanium alloy, in order to increase its corrosion resistance (titanium T40, columbium-titanium alloy, etc.)

Other features, purposes and advantages of the invention will become apparent in light of the description below, when considered in light of the accompanying drawings showing illustratively and without limitation, two preferred embodiments of the invention.

DESCRIPTION OF THE DRAWINGS

FIGS. 2, 3, 4 and 5 are schematic cross-sectional views showing how the rivet of FIG. 1 is placed or set-up;

FIG. 6 is a longitudinal cross-sectional view of the assembly achieved by the rivet of FIG. 1;

DESCRIPTION OF PREFERRED EMBODIMENTS

Figure 1:
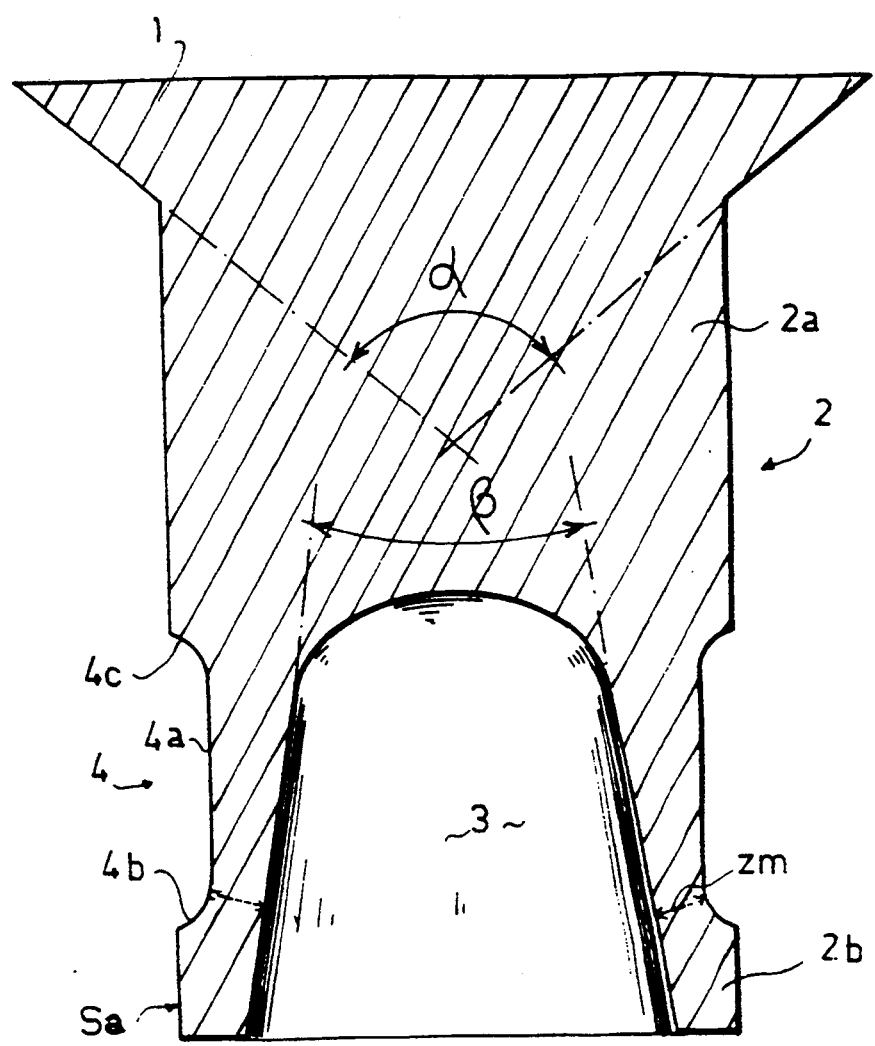
FIG. 1 is a longitudinal sectional view on an enlarged scale of a semi-tubular rivet according to the invention.

The semi-tubular rivet illustratively shown in FIG. 1 in particular may be made of commercially pure titanium T40. The rivet includes on one end a pre-formed, milled head 1 of a tapered shape with an angle $\alpha = 100°$, a cylindrical shank 2 comprising a solid portion 2a extending from the pre-formed head 1, and a semi-tubular portion 2b at the other end, opposite the pre-formed head.

The semi-tubular portion 2b is provided with a tapered axial hole 3 flaring outwardly toward the end opposite the pre-formed head and opening toward this end. The cone angle $\beta$ of this hole may be varied through a wide range of from approximately 10° to 30°. Excellent results are obtained with an angle $\beta$ of 20°.

In this embodiment, the bottom of the hole 3a has a shape approximately of a spherical dome, and the hole 3 extends over somewhat less than half of the length of the shank 2.

The outside of the shank is provided near its tubular portion 2b with a peripheral groove 4 of which the bottom 4a in this instance is cylindrical, and the axis of the groove coinciding with the axis of the shank. This groove 4 begins at a specific distance from the free end of the shank so as to provide between itself and that end an abutment or pinning surface Sa on the outside of the shank. This surface, after forming of the head, will come into abutment with a cooperating surface on the materials being joined for securing the materials.

On the side opposite the pinning surface Sa, the groove 4 extends approximately to the vicinity of the bottom 3a of the axial bore, as shown by FIG. 1. By way of example, if the rivet has a total length of 6.5 mm, the hole 3 may be about 3 mm deep, the pinning surface Sa being about 0.75 mm long axially, and the groove being about 2 mm long and about 0.2 mm deep. Such a groove allows assembling a variety of thicknesses of material which may vary through a range substantially greater than 1 mm in thickness.

The peripheral groove 4 merges with the shank at a circular cross-sectional zone (junction 4b at the pinning side and junction 4c at the opposite side).

The above described groove 4 defines a zone of lesser thickness Zm on the upper tubular portion of the shank and located in the immediate vicinity of the start of the groove on the side of the pinning surface Sa near the junction 4b. Because of the conical shape of the hole 3, the thickness of the tubular portion progressively decreases from the end 4c of the groove to the zone of lesser thickness Zm. Therefore, when the rivet is put in place and a head formed, the tubular part 2b will expand near this zone Zm to progressively spread to the center of the groove.

Figure 2:
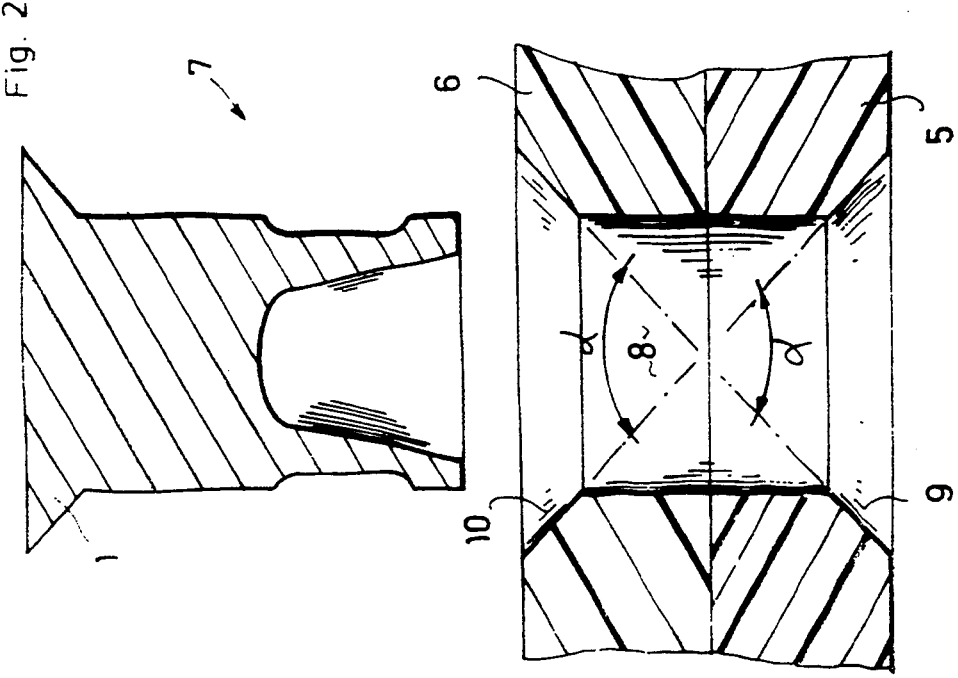

FIG. 2 shows two laminated plastic fiber-reinforced sheets 5 and 6 which are to be joined by rivets 7 of the type described above. The sheets are perforated by a hole 8, the diameter of which corresponds to the outside diameter of the rivet shank plus a slight amount of play, about 0.1 to 0.2 mm. Identical countersunk apertures 9 and 10 are provided in the two sides of the sheets and have a conical angle $\alpha$ identical with that of the milled head 1 of the rivet (100°). It should be noted that the two countersunk apertures 9 and 10 may be formed with the same tool, whereby the set-up work is simplified.

Figure 3:
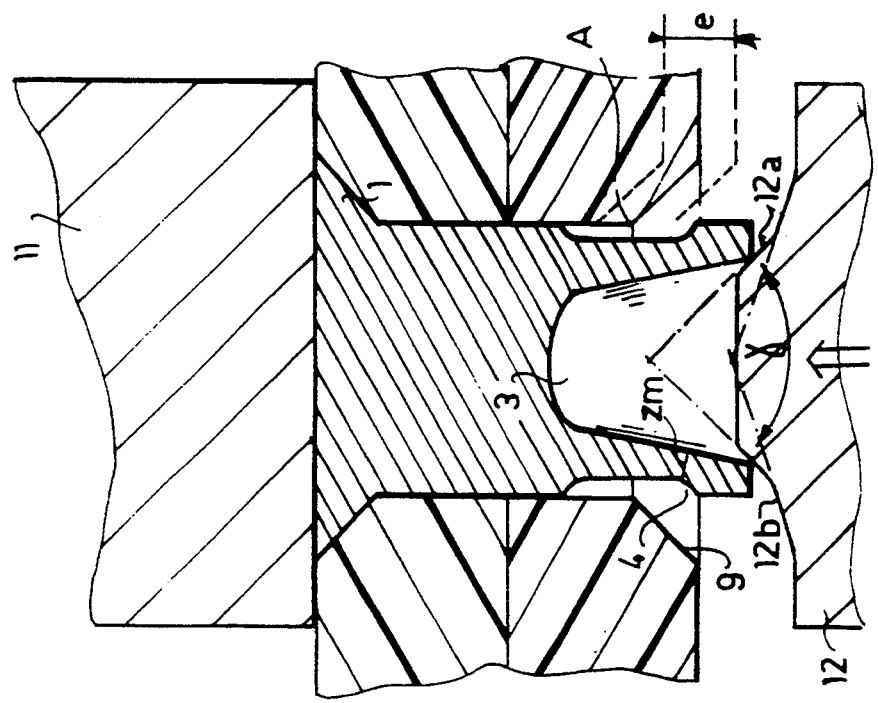

The riveting operation is carried out using two dies such as 11 and 12, shown in FIG. 3, wherein one of the dies (11) assumes the function of matching support on the side of the pre-formed head 1 and the other die (12) is subjected in this instance to a pressure of about 700 to 1200 decanewtons in order to shape the second head and complete the riveting.

The riveting die 12 includes on one hand a wall 12a initiating the riveting process and with a conical angle which may be about 90°, but which is not critical, and on the other hand a riveting wall 12b of a tapering shape with a peak angle $\gamma$ designed to ensure that the tubular end of the rivet will be bent away from the center. For a conical angle of 20° at the hole 3 and 100° at the countersunk aperture 9, the optimum angle $\gamma$ will be 135°.

As shown in FIGS. 4 and 5, the rivet initially deforms without the surface Sa touching the material being joined. The minimum pressure required at this stage is about 700 decanewtons in order that proper strength be achieved, but is not critical above this threshold because of the presence of the groove 4. This groove allows bending the shank without expanding it until much higher pressures—i.e. about 1200 decanewtons—are reached, and the groove protects the junction angle A of the sheets which undergoes no compression at all within this large range of pressures.

The tolerance e relating to the thickness of the sheets being joined is symbolically shown in FIG. 3. Taking into account the rivet bending mode (this bending always starting in the zone Zm and progressing along the groove) it is sufficient that the junction angle A match the groove at a slight offset toward the core of the groove as well as toward the zone Zm and the opposite side. For a 2 mm long groove, the admissible tolerance well exceeds 1 mm.

FIG. 6 shows the final assembly of the sheets and the rivet.

Macrographic examination of the sectioned assemblies shows that the sheets of composite materials are not damaged by the riveting. Further, strength tests have shown that there is satisfactory resistance against loosening, and that this resistance frequently is related to the strength of the composite.

Figure 7:
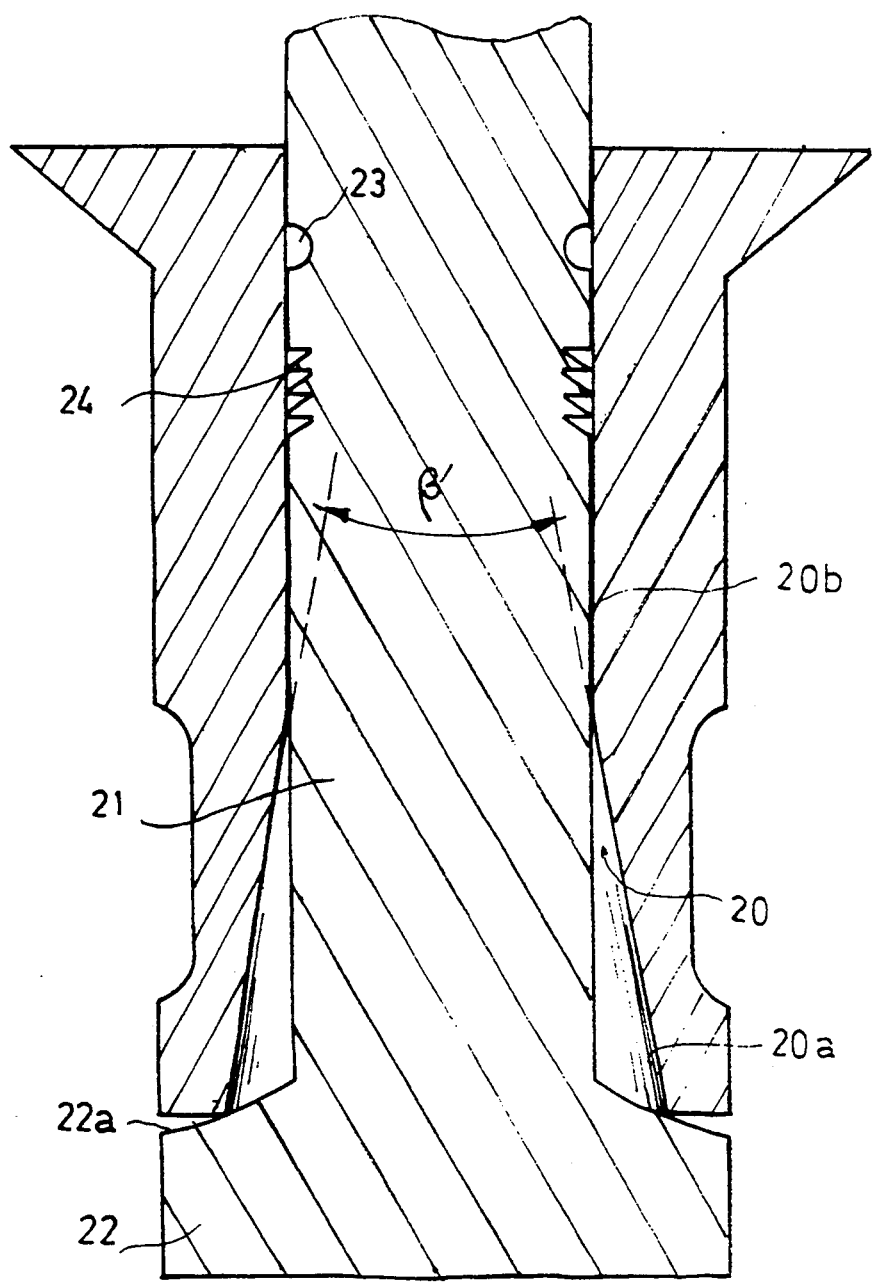
FIG. 7 is a longitudinal sectional view on an enlarged scale of a blind rivet according to the invention and provided with a riveting stem.

FIG. 7 shows a variation of the rivet described above, permitting blind riveting from one side of the assembly of parts.

This rivet displays features analogous to those of the above rivet and only the differences from the foregoing rivet will be described below. This rivet is provided with an axial hole 20 which passes through the shank from one end to the other. On the end opposite the pre-formed head, this axial hole has a frustoconical shape as shown at 20a, while the remaining portion 20b is cylindrical. The cone frustrum 20a opposite the pre-formed head has a cone angle $\beta'$ approximately between 10° and 30°, and preferably about 20°.

The rivet is provided with a riveting stem 21. In this embodiment, the stem has a riveting head 22 of a larger diameter and projecting from the frustoconical portion 20a or the axial hole of the rivet. The head 22 is provided with a riveting wall 22a resting against the tubular end of the rivet. In this example, this wall has a generally tapering cone angle designed to ensure that the tubular rivet end will bend back away from the center. This angle may be about 135°. It should be noted that the riveting appears to be slightly improved if the wall 22a is slightly concave.

The other cylindrical end of the stem 21 projects beyond the pre-formed head of the rivet to allow traction on it. This cylindrical stem portion, as is known in the art, includes a rupture groove 23 where the stem will break, when the traction or pulling force exceeds a predetermined threshold.

The stem 21 also is provided with an annular serration 24, as is known in the art, so that when the stem has ruptured, the serration will prevent the remaining portion of the stem from falling out of the hole in the rivet on the side opposite the pre-formed head.

Figure 8:
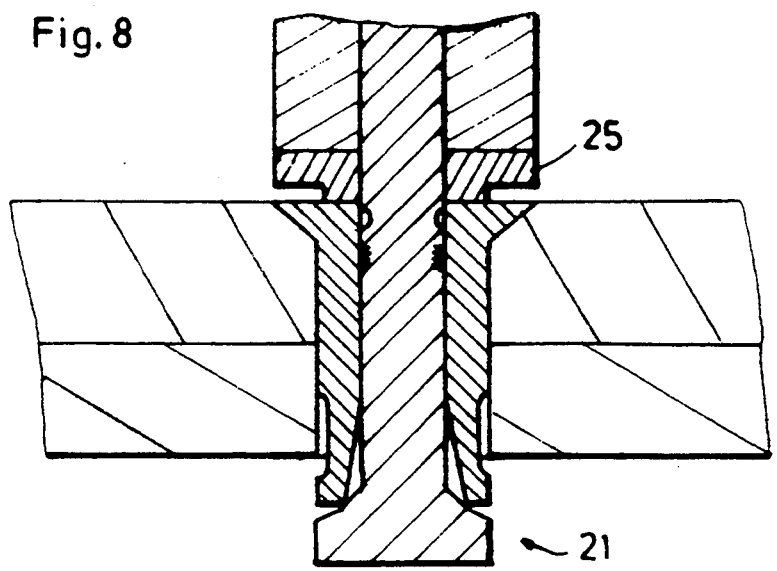
FIGS. 8, 9 and 10 are schematic cross-sectional views showing how the rivet of FIG. 7 is placed or set-up, along with the completed assembly.
Figure 9:
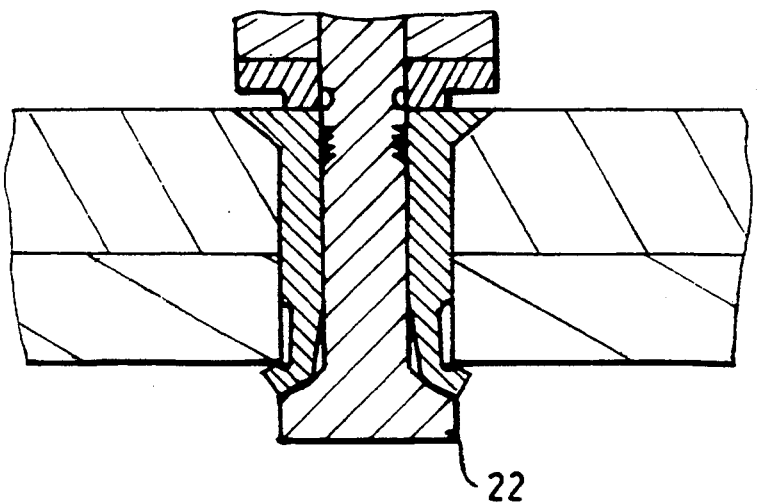
Figure 10:
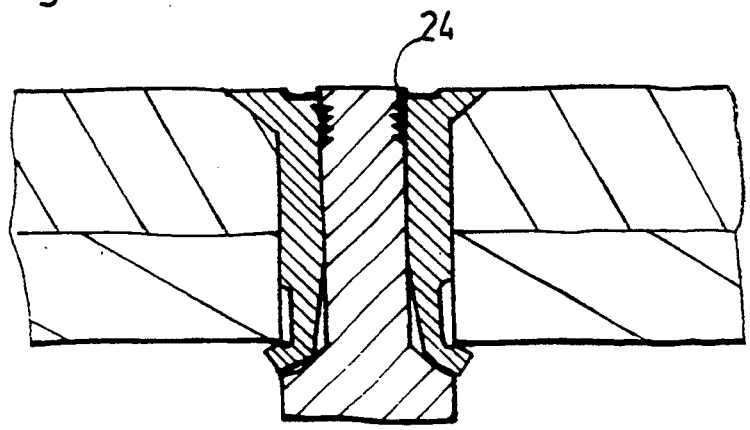

Such a blind rivet is put in place in a conventional manner illustrated in FIG. 8, 9 and 10 by using a matching die 25 associated with a traction means. Following the rupture of the stem, the stem remains in the rivet due to the stem deformation at the serration 24.

It should be noted that the invention also applies to any other type of blind rivet, and particularly to rivets provided with a thrust stem forming the second rivet head by compressing an inner collar inside the axial rivet hole.

It may also be advantageous to lubricate the rivet when putting it in place in order to further reduce any danger of cracks in the material being joined. Similarly, countersunk washers may be inserted on either side or both sides of the sheets to increase the seated area of the rivet.

While this invention has been described with reference to certain preferred features and embodiments, it will be understood that this application is intended to cover any and all variations, modifications and adaptations of the invention as fall within the spirit of the invention and the scope of the appended claims.

We claim:

1. A riveting process for assembling sheets of fragile or brittle materials comprising:

providing in the sheets to be assembled a bore having a cylindrical portion, a first countersunk inlet portion at one end of said cylindrical portion flaring outwardly toward the surface of the sheets to be assembled, providing a rivet having a preformed head and a shank having an external diameter corresponding to that of the cylindrical portion in said sheets to be assembled, said shank having an axial bore extending at least partially thereinto from the end opposite said preformed head in such a manner as to form a tubular shank portion, and a peripheral groove formed on the outer surface of said shank opposite said axial bore so as to locally reduce the external diameter of the shank, said axial bore having a frustoconical shape in the portion thereof opposite said groove, and said groove having an essentially cylindrical bottom so that the wall of said bore and the bottom of said groove define a zone of minimum thickness of the wall of the tubular portion and a zone of increasing thickness of said wall; said groove being spaced a distance from the open end of said tubular section by a portion of said shank defining a pinning surface, said spacing being such that when the rivet is introduced into said bore in the sheets to be assembled, said groove is positioned facing the juncture of the cylindrical portion and said first countersunk inlet portion of said bore, positioning said rivet in said bore in such a manner that said pre-formed head is in contact on one side of said sheets with the sheets being assembled and said groove is positioned on the other side of said sheets facing the juncture of said cylindrical portion and said first countersunk inlet portion, exerting a back-up pressure against said pre-formed head and substantially simultaneously exerting an axial shaping pressure through a riveting die against the tubular portion in such a manner as to radially outwardly deform said tubular portion progressively along said groove, and continuing to apply said pressure until said pinning surface comes into contact with said sheets being assembled, whereby said groove defines a region facing the juncture of said cylindrical portion and said first countersunk inlet portion in which said shank portion does not contact the wall of said bore after said pinning surface contacts said sheets being assembled.

2. A riveting process as in claim 1 and including providing said bore with a second countersunk portion at the other end of said cylindrical portion flaring outwardly toward the other surface of the sheets to be assembled, and positioning said rivet so that said preformed head is in contact with said second countersunk portion.

3. A riveting process as in claim 1 and including deforming the pinning surface portion of said shank without radially expanding the cylindrical portion thereof against the wall of said bore in said sheets.

* * * * *